United States Patent
Crocker et al.

(10) Patent No.: US 7,713,367 B2
(45) Date of Patent: May 11, 2010

(54) TABLE COVERINGS

(76) Inventors: Paul Crocker, Mount Vernon House, Mount Vernon, London NW3 6QR (GB); Lloyd Anthony Keisner, 45 Priory Road, London NW6 (GB)

(*) Notice: Subject to any disclaimer, the term of this patent is extended or adjusted under 35 U.S.C. 154(b) by 726 days.

(21) Appl. No.: 10/590,806

(22) PCT Filed: Jan. 13, 2005

(86) PCT No.: PCT/GB2005/000075

§ 371 (c)(1),
(2), (4) Date: Aug. 25, 2006

(87) PCT Pub. No.: WO2005/095099

PCT Pub. Date: Oct. 13, 2005

(65) Prior Publication Data

US 2007/0175581 A1    Aug. 2, 2007

(30) Foreign Application Priority Data

| Apr. 2, 2004 | (GB) | ................... 0407540.4 |
| May 17, 2004 | (GB) | ................... 0410933.6 |
| May 26, 2004 | (GB) | ................... 0411705.7 |
| Jun. 9, 2004 | (GB) | ................... 0412789.0 |

(51) Int. Cl.
*B29C 65/00* (2006.01)
*B32B 37/26* (2006.01)
*B32B 38/10* (2006.01)

(52) U.S. Cl. ................ 156/247; 156/249; 156/289

(58) Field of Classification Search ............ 156/71, 156/230, 231, 237, 239, 240, 241, 247, 249, 156/281, 289; 428/67, 76, 15, 195, 203, 428/204, 207, 419, 412, 542.2, 542.6
See application file for complete search history.

(56) References Cited

U.S. PATENT DOCUMENTS

| 4,528,055 A | 7/1985 | Hattemer |
| 5,484,638 A | 1/1996 | Crabtree |
| 6,030,705 A | 2/2000 | Buoniconti et al. |
| 2002/0172806 A1 | 11/2002 | McLeod et al. |

FOREIGN PATENT DOCUMENTS

CN        2361463 Y        2/2000

(Continued)

OTHER PUBLICATIONS

English Absbract of JP 2003-154795.*

(Continued)

*Primary Examiner*—Philip C Tucker
*Assistant Examiner*—Sing P Chan
(74) *Attorney, Agent, or Firm*—Lerner, David, Littenberg, Krumholz & Mentlik, LLP

(57) ABSTRACT

A covering, particularly for tables, comprises a layer of semi-permanent adhesive (2) on a clear polymer carrier layer (3) bearing a printed display layer (4). The covering may additionally comprise a substrate (1) of release paper to assist in applying the covering. The covering can be used semi-permanently to cover tables in restaurants and bars for examples, enabling the cover to be removed after a selected period. The cover may be used to present advertising material and may permit the table top to be visible through non-printed regions of the covering.

16 Claims, 3 Drawing Sheets

FOREIGN PATENT DOCUMENTS

| | | |
|---|---|---|
| CN | 2442969 Y | 8/2001 |
| CN | 1 349 206 A | 5/2002 |
| EP | 0 764 917 A1 | 3/1997 |
| EP | 0 909 801 A1 | 4/1999 |
| JP | 2003154795 A * | 5/2003 |
| RU | 2086046 | 7/1997 |

OTHER PUBLICATIONS

Machine English Translation of JP 2003-154795.*
Letter and Search Report dated Sep. 21, 2004 in application GB 0412789.0.
Combined Search and Examination Report dated Feb. 20, 2006 in application GP 0601814.7.
International Search Report completed Apr. 13, 2005.
Derwent Abstract, Train Tea Table Capable of Being Used as Propaganda Medium.
Office Action from corresponding Chinese Application 2005800030063, dated Sep. 12, 2008.
Office Action from corresponding Russian Application 2006128433, dated 2008.
Zeng, Studies on the Factors Affecting the 180° Peel Strength of Pressure Sensitive Tape, 1 page, (2002). (abstract).

* cited by examiner

TABLE COVERINGS

CROSS-REFERENCE TO RELATED APPLICATIONS

This application is a national phase application under 35 U.S.C. §371 of International Application Number PCT/GB2005/000075, filed Jan. 13, 2005, which international application claims the benefit of GB Application No. 0407540.4, filed 2 Apr. 2004; GB Application No. 0410933.6, filed 17 May 2004; GB Application No. 0411705.7, filed 26 May 2004; and GB Application No. 0412789.0, filed 9 Jun. 2004, all of which international and GB applications are herein incorporated by reference in their entireties.

This invention relates to coverings for a table or similar surfaces and, in particular, to such coverings which are particularly suitable for use in commercial eating and/or drinking establishments such as restaurants or cafés.

In such establishments, it is well known to locate promotional material on the tables. This may be in the form of beer mats or it may be printed on place mats of paper or plastic. Inherently, promotional material provided in this way is removable and limited in scope.

An object of the present invention is to provide a table covering which may be used to convert the table top into a promotional medium, is not readily removed or damages by customers and yet may be replaced after a specified length of time. The covering may cover the whole table or may provide a display on part only of said table top.

Thus, according to the present invention a covering for application to a surface top comprises i) a semi-permanent adhesive layer to be in contact with the top, ii) a clear carrier layer, iii) a display layer which is printed on the carrier layer, wherein the table covering is arranged such that when applied to a surface top the nature of the covering is not readily visible except for the printed area, permitting the surface top to be visible through a substantial portion of the covering.

Preferably, the covering additionally comprises a substrate of release paper to be removed before application of the covering to a surface to assist in applying the covering to the surface. However, the covering could alternately be rolled up with the adhesive layer exposed on one side as the covering is unrolled for application to a surface.

The covering is preferably a table covering applied to a table top.

The method by which a table covering of the present invention is used to finish a table top comprises providing a smooth table surface which is free of protuberances and applying to the table top the table covering described in the preceding paragraph, whilst removing the layer (i) of release paper from the table covering to allow the semi-permanent adhesive layer (ii) to adhere to the table top. When necessary any air bubbles which are trapped beneath the table covering may be forced out using a suitable roller or squeegee.

The table covering may be made to cover substantially the whole of the table top with preferably any gap between the covering and the edge of the table is no more than 50 mm. If desired, the table covering may be of a shape and size to wrap over a part or parts of one or more edges of the table top to which it is applied, but preferably the shape and size of each table covering in accordance with the invention is such as to avoid the table covering having to be folded or pleated when it is applied to the table.

The printed display layer of the covering may extend over the whole area of the table covering, or it may be discontinuous and the printed display may consist of decorative and/or advertising material.

The table covering of the invention may be made to cover substantially the whole of the table top with the display layer substantially less in area than the table, the positioning of display layer in relation to the table top being chosen to suit the particular circumstances of the case.

If desired, the table covering may be of a size and/or shape suitable to extend only over a part of a table top.

The printed display layer of the covering may extend over substantially the whole area of the table covering if the latter is to cover only a part of the table top. On the other hand, the display layer may be located on only a minor portion of the table covering. The printed display may consist of decorative and/or advertising material.

It is a feature of the invention that the nature of the table covering is not to be readily visible, except for the printed area, to the customer using the table, permitting the table top to be visible through the non-printed areas, hence the carrier layer of polymer film and the semi-permanent adhesive layer beneath are to be totally clear, the appearance of the covering thus being in the nature of a finish on the table top. For this reason, the thickness of the film is important, the preferred thickness of the clear film being in the range 10 to 100 microns, more preferably 15 to 70 microns. The polymer used for the film is preferably flexible thermoplastic polyester such as polyethylene terephthalate (PET).

In use, the table covering of the invention is to be replaced at regular internals of, for example, one month. Hence, the role of the semi-permanent adhesive is to grip the table top securely whilst the table covering is in use and yet allow complete removal and replacement of the table covering at the end of the desired period. The preferred adhesives are water clear, solvent based acrylic adhesives.

In a preferred embodiment of the invention, the table covering includes a second layer of polymer film which is to protect the printed layer and is glued over the printed display layer by means of a second layer of adhesive. The second layer of polymer film may be of a material approved for food contact applications. The glue by which it is applied is preferably an adhesive which is approved for indirect food contact applications. The preferred materials are clear oriented polypropylene (OPP) film for the protective polymer layer and clear EVA adhesive for the glue.

Preferably, the second layer of the polymer film has a thickness in the range 5 to 20 microns.

The method used to apply the table covering is simple, but care must be taken to make sure that the surface to which the covering is applied is clean and smooth and free of protuberances such as could be cause blemishes or solid particles (such as salt) on the surface.

Since the carrier layer of polymer film is itself thin and some precision is required in applying the table covering to the table top, in a further embodiment of the invention, an additional layer of release paper is provided on the top surface of the table covering, ie on the surface opposite to that of the substrate layer (i). The second layer of release paper is provided to make handling of the table covering easier. Depending upon the nature of the carrier layer of the table covering, it may be removed before or after application of the table covering to a table top has been carried out. In general, the thinner the carrier layer the more likely it is that the second layer of release paper will be retained on the table covering until after the table covering has been applied to a table top.

The invention will now be described in more detail, by way of example only, with reference to the accompanying drawings illustrating application of the covering to a table top, however the invention is not in anyway limited to only table top applications. In the drawings.

Figure 1:
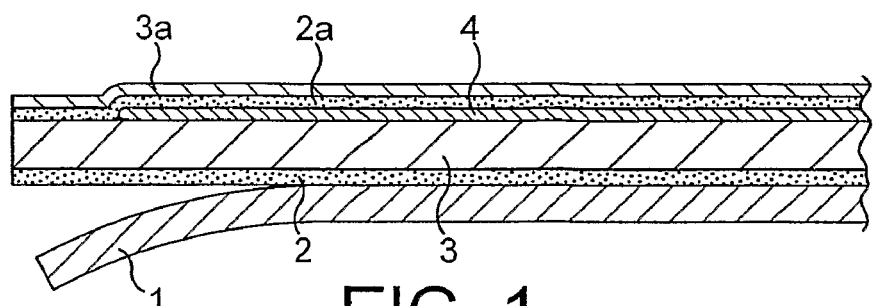
FIG. 1 is a sketch showing a magnified cross section of a part of a table covering according the invention.

The table covering shown in FIG. 1 consists of a substrate 1 of release paper, a layer of semi-permanent adhesive 2 on a carrier layer of polymer 3 bearing a printed display layer 4 and glued over the printed layer 4 by means of a second layer of adhesive 2a, a second layer of polymer film 3a. However, in an alternative embodiment, not illustrated, the release paper may be omitted with the covering being rolled up prior to application, such that the adhesive layer is exposed as the covering is unrolled immediately prior to application to the table top.

The semi-permanent adhesive of layer 2 is a solvent based water clear acrylic adhesive and layer 2 has a thickness of approximately 25 microns.

The carrier layer 3 is made from a commercially available clear PET film having a thickness of 38 microns, printed on which is the printed layer 4.

The printed display layer 4 is protected by the second layer of polymer 3a which is made from clear oriented polypropylene film having a thickness of approximately 8 microns. The adhesive layer 2a, by means of which the second polymer layer is attached, is made from a clear EVA adhesive.

Figure 2:
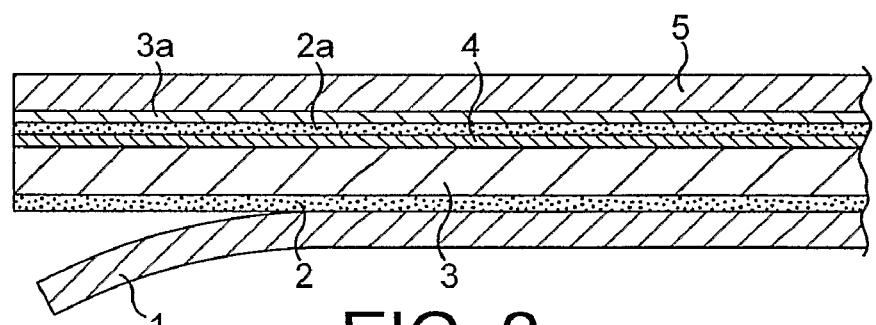
FIG. 2 is a similar sketch of a second embodiment of the invention.

The embodiment shown in FIG. 2 is similar to that shown in FIG. 1 except that the table covering of FIG. 2 includes, on the second polymer layer 3a, a second layer of release paper 5 to assist in application of the covering to a table top.

Figure 3:
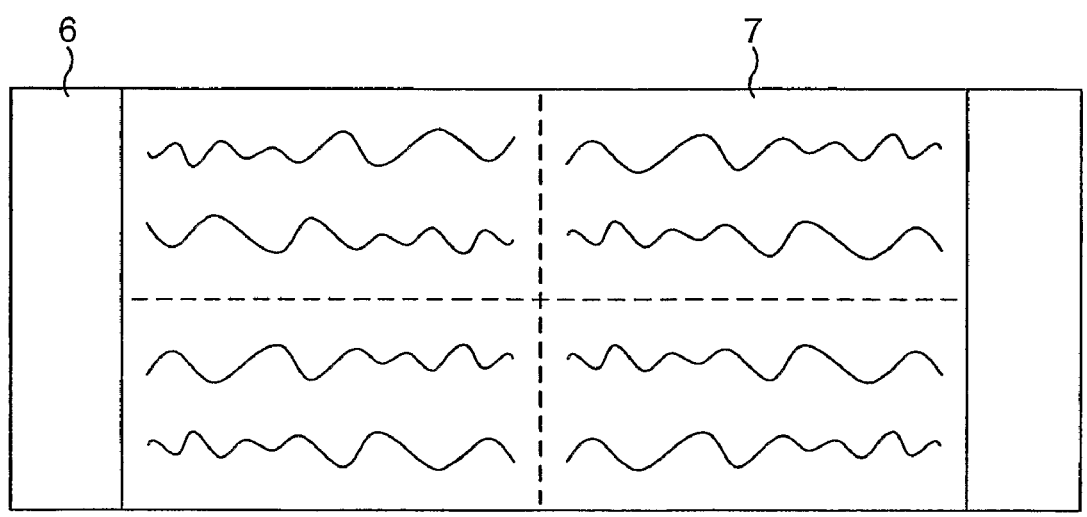
FIG. 3 is a sketch showing a plan view of a rectangular table covering in accordance with the invention.

FIG. 3 shows a plan from above, a rectangular table covering in which the carrier layer of clear PET film 6 carries a printed layer 7 which is smaller in area than the carrier layer.

Figure 4:
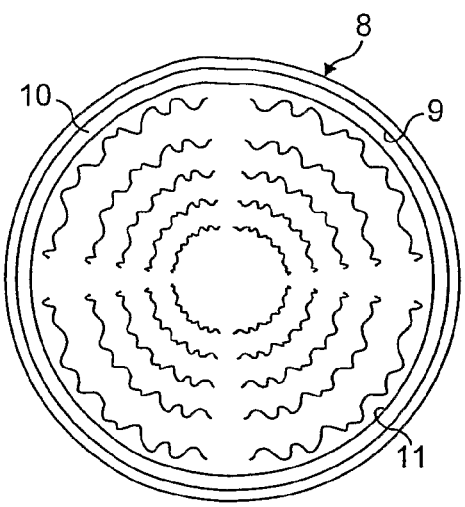
FIG. 4 is a sketch showing a plan view of a circular table covering in accordance with the invention on a table top.

FIG. 4 is a plan view showing a circular table covering in position on a circular table top 8. The table covering is also circular and its size is such that the edge 9 of the carrier layer of clear polymer film 10 is 10 mm from the edge of the table top.

The distance of the edge 11 of the printed area of the table covering from the edge 9 of the clear polymer film is not critical and depends upon the nature of the display material comprising the printed layer.

Figure 5:
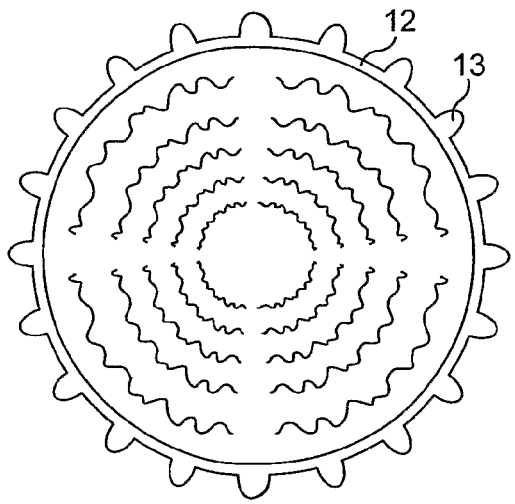
FIG. 5 is a sketch showing a plan view of another embodiment of circular table covering in accordance with the invention.

FIG. 5 shows, in plan from above, a circular table covering in which the carrier layer of clear polymer film 12 has tabs 13 around its edge which are designed in use to wrap over the edge of a circular table top to provide additional anchorage for the table covering.

Figure 6:
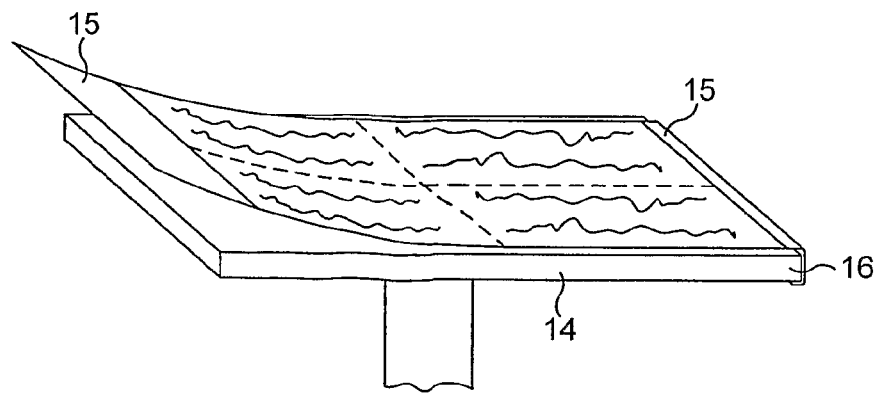
FIG. 6 is a sketch showing a perspective view of the rectangular table covering of FIG. 3 during its application to a table top.

FIG. 6 is a perspective view illustrating the method of application of the table coverings of this invention, using as an example the rectangular table covering of FIG. 3.

The table covering is applied from one end of a rectangular table top 14 and in this case, the carrier layer 15 is long enough to wrap over the end 16 of the table top. During application, the release paper layer (not shown in the sketch) is removed from the table covering to expose the semi-permanent adhesive layer of the table covering and enable the table covering to adhere to the smooth table top which has been provided.

Figure 7:
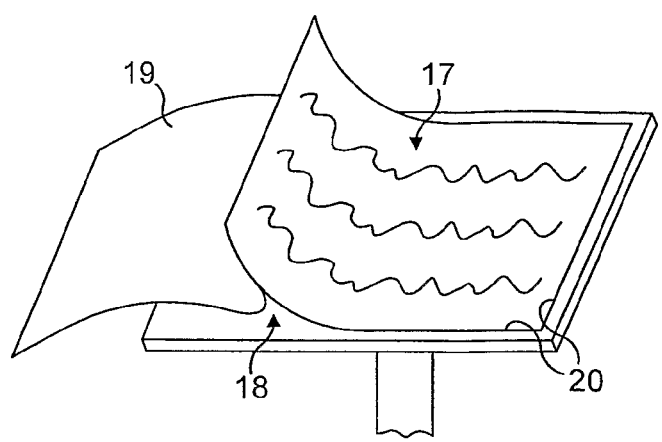
FIG. 7 is a sketch showing a perspective view of a square table covering during its application to a square table top.

FIG. 7 is a perspective view illustrating the application to a table top of another table covering in accordance with the invention.

In this case, a square table covering 17 is being applied to a square table top 18, a layer of release paper 19 being steadily removed from the table covering to expose adhesive as the table covering is applied.

The printed display layer of the table covering 17 extends over the whole area of the table covering and the edges 20 of the table covering 17 are positioned 10 mm from the edges of the table top 18, there being no wrap-over of the table covering onto the edges of the table top in this embodiment.

Figure 8:
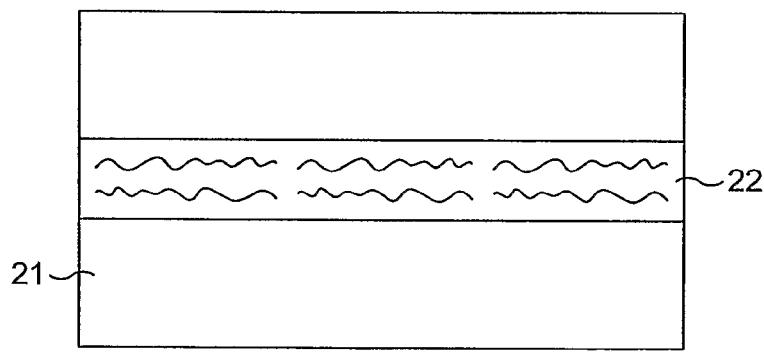
FIG. 8 is a sketch showing a plan view of a rectangular table covering in accordance with the invention.

FIG. 8 shows, in plan from above, a rectangle table 21 bearing a table covering 22 extending only over the central "spine" of the table top. In this embodiment, the carrier layer of clear PET film may wrap over the ends of the table top (not shown) and carries a printed layer which extends over the whole area of the carrier layer which is on the top surface of the table.

Figure 9:
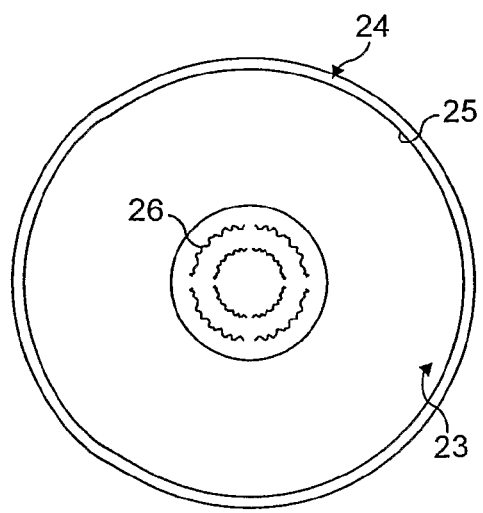
FIG. 9 is a sketch showing a plan view of a circular table covering in accordance with the invention on a table top.

FIG. 9 is a plan view showing a circular table covering 23 in position on a circular table top 24. The table covering is also circular and its size is such that the edge 25 of the carrier layer of clear polymer film is 10 mm from the edge of the table top.

The printed area of table covering is a small area 26 in the centre of the table covering.

Although described above with application to a table, the table covering can be applied to similar surfaces such as a bar or counter top.

The invention claimed is:

1. A method of converting a surface top into a promotional medium in a commercial eating and/or drinking establishment in which the surface top is used by customers, said method comprising:

providing a surface top covering having a carrier film layer bearing a printed area forming a printed display layer constituting the promotional medium, a semi-permanent adhesive layer and a layer of release paper covering the semi-permanent adhesive layer wherein the carrier film layer has opposing faces of which one face bears the printed display layer, wherein a clear film layer of a polymer is glued over the printed display layer by a clear adhesive layer to protect the printed display layer, and wherein the other of the opposing faces of the carrier film layer bears the semi-permanent adhesive layer, removing the layer of release paper and applying the surface top covering to the surface top by contacting the semi-permanent adhesive layer with the surface top to grip the surface top securely while the surface top covering is in use by the customers, while not allowing the covering to be removed readily or damaged by the customers and yet allowing complete removal of the surface top covering after a specified length of time, completely removing the surface top covering with the carrier film layer, printed display layer and semi-permanent adhesive layer from the surface top after said specified length of time, and either leaving the surface top without a replacement surface top covering or replacing the removed surface top covering after said specified length of time by applying another surface top covering, having the carrier film layer, printed display layer constituting the promotional medium and semi-permanent adhesive layer, to the surface top by removing the release paper layer of the another surface top covering and contacting the semi-permanent adhesive layer of the another surface top covering with the surface top.

2. A method as claimed in claim 1, wherein the surface top covering is replaced at regular intervals.

3. A method as claimed in claim 2, wherein the regular intervals are one month.

4. A method as claimed in claim 1, wherein the carrier film layer has a clear non-printed area and wherein the semi-permanent adhesive layer is clear, whereby the surface top covering when gripping the surface top securely is not readily visible by the customer using the surface top except for the printed area of the carrier film layer, thereby permitting the surface top to be visible through the clear non-printed area of the carrier film layer and having the appearance of a finish on the surface top.

5. A method as claimed in claim 1, wherein the printed display layer extends over the whole area of the surface top covering.

6. A method as claimed in claim 1, wherein the semi-permanent adhesive layer is a solvent based water clear acrylic adhesive.

7. A method as claimed in claim 1, wherein the carrier film layer is of polyethylene terephthalate.

8. A method as claimed in claim 1, wherein the carrier film layer has a thickness of not more than 100 microns.

9. A method as claimed in claim 1, wherein the carrier film layer has a thickness in the range of 10 to 100 microns.

10. A method as claimed in claim 1, wherein the carrier film layer has a thickness in the range of 15 to 70 microns.

11. A method as claimed in claim 1, wherein the clear film layer of a polymer is approved for food applications.

12. A method as claimed in claim 1, wherein the clear film layer of a polymer is of clear oriented polypropylene.

13. A method as claimed in claim 1, wherein the clear adhesive layer that glues the clear film layer of a polymer over the printed display layer is a clear EVA adhesive.

14. A method as claimed in of claim 1, wherein the clear film layer of a polymer has a thickness in the range of 5 to 20 microns.

15. A method as claimed in claim 1, wherein a second layer of release paper covers a surface of the surface top covering that is opposite to said layer of release paper covering the semi-permanent adhesive layer, said second layer of release paper acting as an aid to the handling of the surface top covering during its application to the surface top and subsequently being removed.

16. A method as claimed in claim 1, wherein the surface top covering is applied to a table surface top.

* * * * *